(12) United States Patent
Zhou et al.

(10) Patent No.: US 12,528,106 B2
(45) Date of Patent: Jan. 20, 2026

(54) DISMANTLING DEVICE FOR WASTE PHOTOVOLTAIC MODULE BY LIQUID EJECTION

(71) Applicant: CHANGZHOU INSTITUTE OF TECHNOLOGY, Changzhou (CN)

(72) Inventors: Pin Zhou, Changzhou (CN); Jingbo Zhao, Changzhou (CN); Xiaohui Chen, Changzhou (CN); Quanfa Zhou, Changzhou (CN); Shubo Wang, Changzhou (CN); Yu Zhao, Changzhou (CN)

(73) Assignee: CHANGZHOU INSTITUTE OF TECHNOLOGY, Changzhou (CN)

( * ) Notice: Subject to any disclaimer, the term of this patent is extended or adjusted under 35 U.S.C. 154(b) by 541 days.

(21) Appl. No.: 18/103,527

(22) Filed: Jan. 31, 2023

(65) Prior Publication Data
US 2024/0051002 A1 Feb. 15, 2024

(30) Foreign Application Priority Data

Aug. 11, 2022 (CN) .......................... 202210962515.4

(51) Int. Cl.
*B08B 13/00* (2006.01)
*B09B 3/70* (2022.01)
*B09B 101/15* (2022.01)

(52) U.S. Cl.
CPC ............ *B09B 3/70* (2022.01); *B09B 2101/15* (2022.01)

(58) Field of Classification Search
None
See application file for complete search history.

(56) References Cited

FOREIGN PATENT DOCUMENTS

| CN | 109092842 A | 12/2018 | |
|---|---|---|---|
| CN | 109397213 A | * 3/2019 | ............... B25H 1/08 |

* cited by examiner

*Primary Examiner* — Eric W Golightly
(74) *Attorney, Agent, or Firm* — Bayramoglu Law Offices

(57) ABSTRACT

A dismantling device for a waste photovoltaic module by liquid ejection includes a table top, a lifting tray, a bottom suction cup, a top suction cup and a chassis fixedly arranged on a lower side of the table top. A middle part of the table top is provided with a tray hole. The lifting tray corresponds to the tray hole up and down. A tray lifting motor is mounted in the chassis, and an upper end of an output shaft of the tray lifting motor is fixedly connected to the lifting tray. Left and right sides of the tray hole are respectively provided with an ejection mechanism X-direction sliding table, and a slider of the ejection mechanism X-direction sliding table is fixedly provided with an ejection mechanism.

8 Claims, 3 Drawing Sheets

DISMANTLING DEVICE FOR WASTE PHOTOVOLTAIC MODULE BY LIQUID EJECTION

CROSS REFERENCE TO THE RELATED APPLICATIONS

This application is based upon and claims priority to Chinese Patent Application No. 202210962515.4, filed on Aug. 11, 2022, the entire contents of which are incorporated herein by reference.

TECHNICAL FIELD

The disclosure relates to the technical field of dismantling of photovoltaic modules, in particular to a dismantling device for a waste photovoltaic module by liquid ejection.

BACKGROUND

When recycling a waste photovoltaic module, it is necessary to dismantle it. To dismantle a photovoltaic module, the aluminum frame and the junction box are removed first, and then the remaining part is dismantled by a wet process or a dry process.

In the wet process, an organic solvent is typically used to dissolve EVA so as to separate the cells, EVA, glass and backsheet. However, this process takes a long time, which requires a reaction cycle of about 7 days, so it is difficult to apply it in actual production. Moreover, the organic solvent permeates from the outside to the inside, the EVA starts to be dissolved from the outside, and the cells are not evenly stressed, which easily causes the cells to break.

A Chinese patent (patent number: CN109092842A) discloses a dismantling method of a scrapped photovoltaic module. Before the backsheet is removed, a longitudinal cut is made with a blade on the side of the backsheet close to the liquid to be ejected, and the cut is deep enough to at least extend to the silicon wafer layer and even the glass layer, so that the liquid ejected from the gun is sprayed through the cut into the inside of the photovoltaic module. However, this only shortens the reaction cycle. The cut itself has damaged the cells, and the dissolution process of the EVA may further damage the cells.

SUMMARY

An object of the disclosure is to provide a dismantling device for a waste photovoltaic module by liquid ejection so as to overcome the defects in the prior art.

To achieve the above object, the disclosure adopts the following technical solutions:

A dismantling device for a waste photovoltaic module by liquid ejection includes a table top, a lifting tray, a bottom suction cup, a top suction cup and a chassis fixedly arranged on a lower side of the table top. A middle part of the table top is provided with a tray hole. The lifting tray corresponds to the tray hole up and down. A tray lifting motor is mounted in the chassis, and an upper end of an output shaft of the tray lifting motor is fixedly connected to the lifting tray. Left and right sides of the tray hole are respectively provided with an ejection mechanism X-direction sliding table, and a slider of the ejection mechanism X-direction sliding table is fixedly provided with an ejection mechanism. The ejection mechanism includes a Y-direction sliding table. A slider of the Y-direction sliding table is located on a side close to the lifting tray. The slider of the Y-direction sliding table is fixedly provided with a liquid collection cavity. An inner side of the liquid collection cavity is provided with a flat ejection portion, and an inner side of the ejection portion communicates with a plurality of ejection branch tubes. The liquid collection cavity communicates with an ejected liquid coupling. An ejected liquid pump is arranged in the chassis. An inlet end of the ejected liquid pump is connected to an ejected liquid supply tube. An outlet end of the ejected liquid pump is connected with a distributing tube. The distributing tube is provided with a same number of liquid valves as the ejection mechanisms. Each liquid valve is connected to an ejected liquid tube, and the other end of the ejected liquid tube is connected to the corresponding ejected liquid coupling.

Preferably, a table top limiting portion is arranged in the tray hole, and two sides of the lifting tray are respectively provided with tray limiting strips corresponding to the table top limiting portion up and down.

Preferably, the ejection branch tube has a same external thickness as the ejection portion and a width gradually narrowing from an outer end to an inner end.

Preferably, the ejection branch tube has an external thickness of 0.25 mm-0.3 mm.

Preferably, a middle part of the lifting tray is provided with a suction cup hole. The bottom suction cup corresponds to the suction cup hole up and down. A turning motor is mounted in the chassis. An upper side of the table top is provided with a top frame, and a lower side of the top frame is fixedly provided with a top suction cup driving cylinder. A lower end of a piston rod of the top suction cup driving cylinder is connected to the top suction cup.

Preferably, two air suction pumps are arranged in the chassis, and a coupling of each air suction pump is connected with an air suction tube. The bottom suction cup and the top suction cup are respectively provided with an air tube coupling, and each air tube coupling is connected to one air suction tube.

Preferably, an upper end of an output shaft of the turning motor is fixedly provided with a bottom suction cup driving cylinder, and an upper end of a piston rod of the bottom suction cup driving cylinder is fixedly connected to the bottom suction cup.

Preferably, front and rear sides of the tray hole are respectively provided with an ejection mechanism Y-direction sliding table, sliders of the ejection mechanism Y-direction sliding tables are respectively fixedly provided with the ejection mechanism, and the ejection branch tubes of the ejection mechanism face the lifting tray.

The disclosure has the following advantages:

1. By ejecting the liquid inward from the edge of the photovoltaic module and gradually inserting the ejection branch tube into the EVA layer in the ejection process, the solvent can be evenly introduced to the inside of the EVA layer, so that the EVA layer is dissolved evenly, thereby shortening the reaction cycle and reducing the damage to the cells.

2. While the ejection branch tube is ejecting the liquid and being inserted into the EVA layer, the ejection mechanism swings in a direction perpendicular to the insertion direction, which can widen the ejection range and prevent jamming during insertion.

3. The upper and lower sides of the photovoltaic module are respectively fixed by suction cups with negative pressure, which can prevent the photovoltaic module from sliding in the dismantling process and ensure the stability of the operation process.

In the figures: 1, table top; 2, ejection mechanism X-direction sliding table; 3, ejection mechanism; 31, Y-direction sliding table; 32, liquid collection cavity; 33, ejected liquid coupling; 34, ejection portion; 35, ejection branch tube; 4, ejected liquid tube; 5, ejected liquid pump; 6, distributing tube; 7, liquid valve; 8, lifting tray; 9, suction cup hole; 10, bottom suction cup; 11, turning motor; 12, bottom suction cup driving cylinder; 13, tray lifting motor; 14, tray limiting strip; 15, table top limiting portion; 16, top frame; 17, top suction cup driving cylinder; 18, top suction cup; 19, air suction pump; 20, air suction tube; 21, chassis; and 22, liquid collection tank.

DETAILED DESCRIPTION OF THE EMBODIMENTS

The technical solutions in the embodiments of the disclosure will be clearly and completely described below with reference to the accompanying drawings in the embodiments of the disclosure. It is apparent that the described embodiments are only a part of the embodiments, rather than all of the embodiments of the disclosure.

Figure 1:
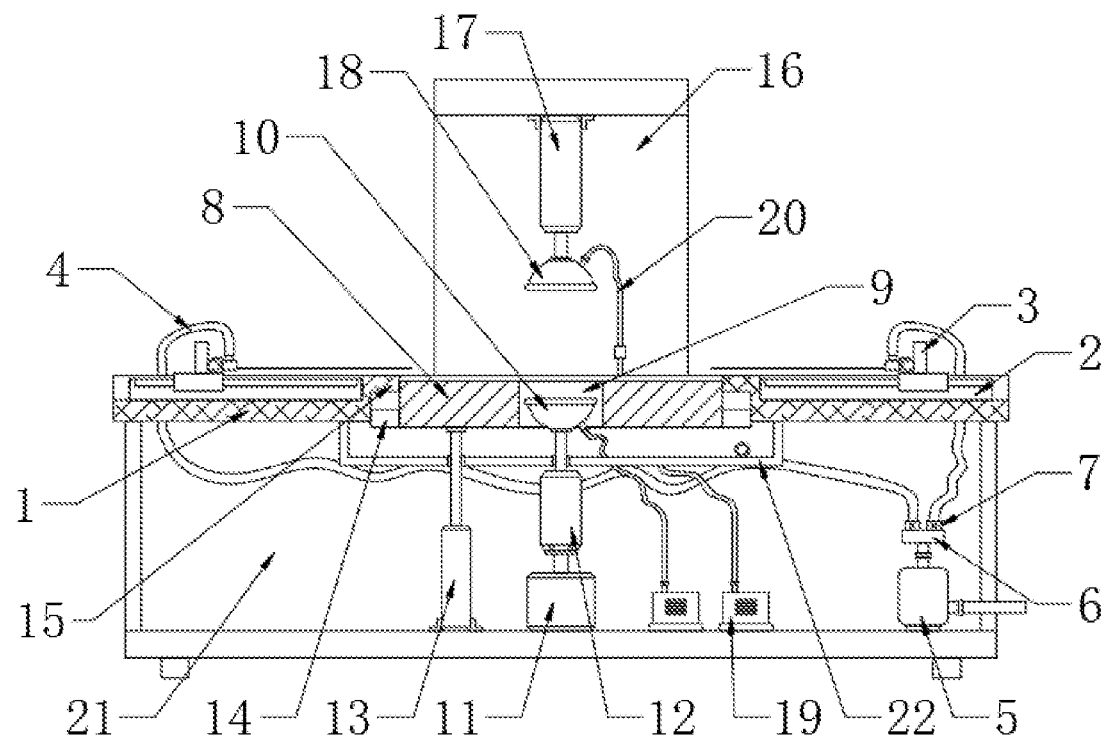
FIG. 1 is a schematic structural diagram of a front view of a dismantling device for a waste photovoltaic module by liquid ejection according to Embodiment I of the disclosure.
Figure 2:
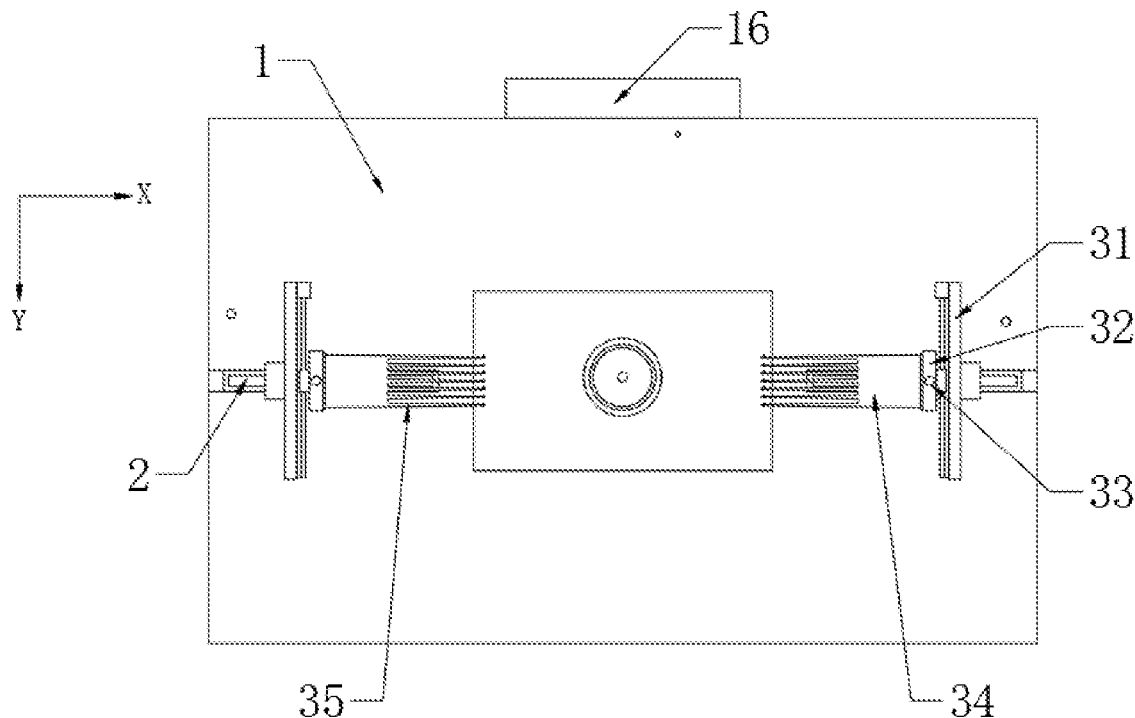
FIG. 2 is a schematic structural diagram of a top view of the dismantling device for a waste photovoltaic module by liquid ejection according to Embodiment I of the disclosure.
Figure 3:
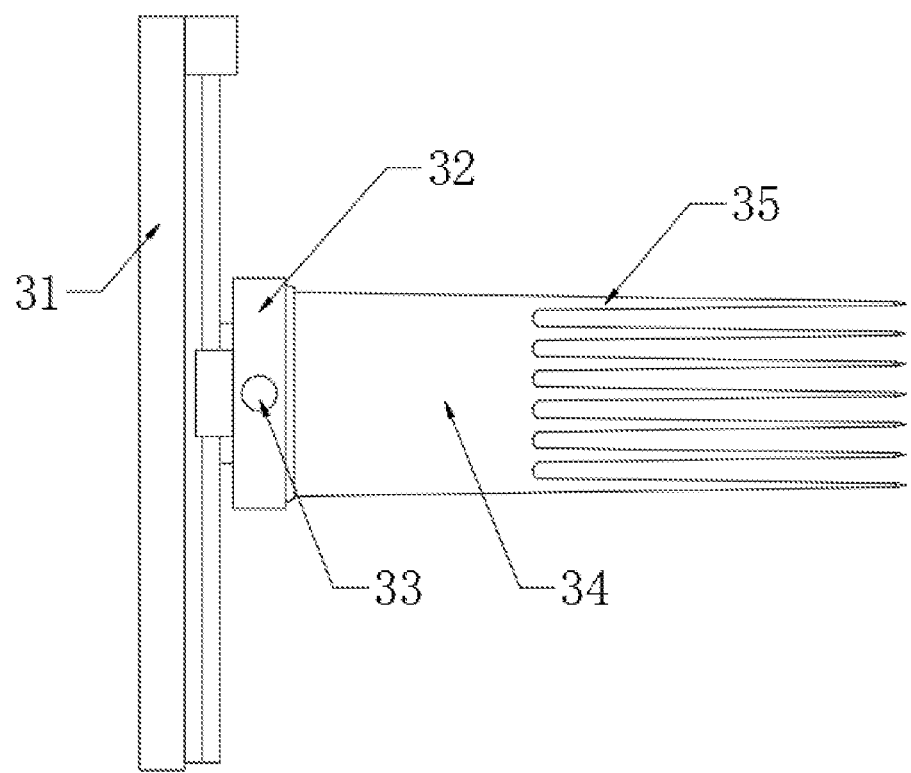
FIG. 3 is a schematic structural diagram of an ejection mechanism of the dismantling device for a waste photovoltaic module by liquid ejection according to the disclosure.

Embodiment I: Referring to FIGS. 1-3, a dismantling device for a waste photovoltaic module by liquid ejection includes a table top 1, a lifting tray 8, a bottom suction cup 10, a top suction cup 18 and a chassis 21 fixedly arranged on a lower side of the table top 1.

A middle part of the table top 1 is provided with a tray hole. The lifting tray 8 corresponds to the tray hole up and down. A tray lifting motor 13 is mounted in the chassis 21, and an upper end of an output shaft of the tray lifting motor 13 is fixedly connected to the lifting tray 8.

A table top limiting portion 15 is arranged in the tray hole, and two sides of the lifting tray 8 are respectively provided with tray limiting strips 14 corresponding to the table top limiting portion 15 up and down. In this way, the uppermost end of the stroke of the lifting tray 8 can be limited.

Left and right sides of the tray hole are respectively provided with an ejection mechanism X-direction sliding table 2, and a slider of the ejection mechanism X-direction sliding table 2 is fixedly provided with an ejection mechanism 3.

The ejection mechanism 3 includes a Y-direction sliding table 31. A slider of the Y-direction sliding table 31 is located on a side close to the lifting tray 8. The slider of the Y-direction sliding table 31 is fixedly provided with a liquid collection cavity 32. An inner side of the liquid collection cavity 32 is provided with a flat ejection portion 34, and an inner side of the ejection portion 34 communicates with a plurality of ejection branch tubes 35. The ejection branch tube 35 has a same external thickness as the ejection portion 34 and a width gradually narrowing from an outer end (end near the liquid collection cavity) to an inner end (end near the lifting tray).

The EVA layer of the photovoltaic panel generally has a thickness of 0.3 mm-0.8 mm, typically 0.5 mm, so the ejection branch tube 35 has an external thickness of 0.25 mm-0.3 mm.

The liquid collection cavity 32 communicates with an ejected liquid coupling 33. An ejected liquid pump 5 is arranged in the chassis 21. An inlet end of the ejected liquid pump 5 is connected to an ejected liquid supply tube. An outlet end of the ejected liquid pump 5 is connected with a distributing tube 6. The distributing tube 6 is provided with a same number of liquid valves 7 as the ejection mechanisms 3. Each liquid valve 7 is connected to an ejected liquid tube 4, and the other end of the ejected liquid tube 4 is connected to the corresponding ejected liquid coupling 33.

A middle part of the lifting tray 8 is provided with a suction cup hole 9. The bottom suction cup 10 corresponds to the suction cup hole 9 up and down. A turning motor 11 is mounted in the chassis 21. An upper end of an output shaft of the turning motor 11 is fixedly provided with a bottom suction cup driving cylinder 12, and an upper end of a piston rod of the bottom suction cup driving cylinder 12 is fixedly connected to the bottom suction cup 10.

An upper side of the table top 1 is provided with a top frame 16, a lower side of the top frame 16 is fixedly provided with a top suction cup driving cylinder 17, and a lower end of a piston rod of the top suction cup driving cylinder 17 is connected to the top suction cup 18.

Two air suction pumps 19 are arranged in the chassis 21, and a coupling of each air suction pump 19 is connected with an air suction tube 20. The bottom suction cup 10 and the top suction cup 18 are respectively provided with an air tube coupling, and each air tube coupling is connected to one air suction tube 20.

The ejection mechanism X-direction sliding tables 2, the Y-direction sliding tables 31, the ejected liquid pump 5, the liquid valves 7, the turning motor 11, the bottom suction cup driving cylinder 12 and the tray lifting motor 13 are all electrically connected to a PLC system and controlled by the PLC system.

The photovoltaic panel with the aluminum alloy frame removed is placed on the lifting tray 8 by a mechanical arm. The tray lifting motor 13 drives the lifting tray 8 to move to a proper position, so that the ejection branch tubes 35 on the two sides are aligned with the EVA layer between the backsheet and the cells. The bottom suction cup driving cylinder 12 drives the bottom suction cup 10 to move up, and the top suction cup driving cylinder 17 drives the top suction cup 18 to move down. After the bottom suction cup 10 and the top suction cup 18 come into contact with the photovoltaic panel, the two air suction pumps 19 start to draw air so as to form a negative pressure respectively inside the bottom suction cup 10 and the top suction cup 18, so that the photovoltaic panel is firmly held by the bottom suction cup and the top suction cup.

Then, the ejected liquid pump 5 is started, and the liquid valves 7 are opened. The ejected liquid enters the liquid collection cavity 32 through the ejected liquid tubes 4, and then are distributed into the ejection branch tubes 35, such that the ejected liquid is ejected onto the EVA layer. While ejecting the ejected liquid, the slider on the Y-direction sliding table 31 moves back and forth, so as to drive each ejection branch tube 35 to reciprocate along the Y direction, thereby increasing the ejection area. As the ejection proceeds, the sliders of the ejection mechanism X-direction sliding tables 2 gradually move toward the center, so that the ejection branch tubes 35 are gradually inserted into the EVA layer. The EVA layer is softened and dissolved by the ejected liquid while the ejected liquid is being ejected into the EVA layer, which increases the dissolution rate.

Then, the sliders of the ejection mechanism X-direction sliding table 2 move outward to an original positions thereof, the pressure inside the top suction cup 18 is relieved, and the top suction cup driving cylinder 17 drives the top suction cup 18 to move upward. After the turning motor 11 drives the photovoltaic panel to rotate by 90°, the top suction cup driving cylinder 17 drives the top suction cup 18 to move downward. The corresponding air suction pump 19 draws the air to form a negative pressure inside the top suction cup 18, such that the photovoltaic panel is fixed.

Then, the liquid ejection process is repeated once from the other two sides of the EVA layer. The ejected liquid is also ejected from outside to inside while the ejection branch tube 35 is inserted into the EVA layer. After the ejection is completed, the sliders of the ejection mechanism X-direction sliding tables 2 move outward to the original positions thereof. Then, the tray lifting motor 13 drives the lifting tray 8 to move, so that the ejection branch tubes 35 on the two sides are aligned with the EVA layer between the tempered glass and the cells. The above ejection process is repeated, such that the ejected liquid is fully ejected into the two EVA layers. Then, the pressure in the bottom suction cup 10 and the top suction cup 18 is relieved, and the photovoltaic panel is taken down by the mechanical arm.

Figure 4:
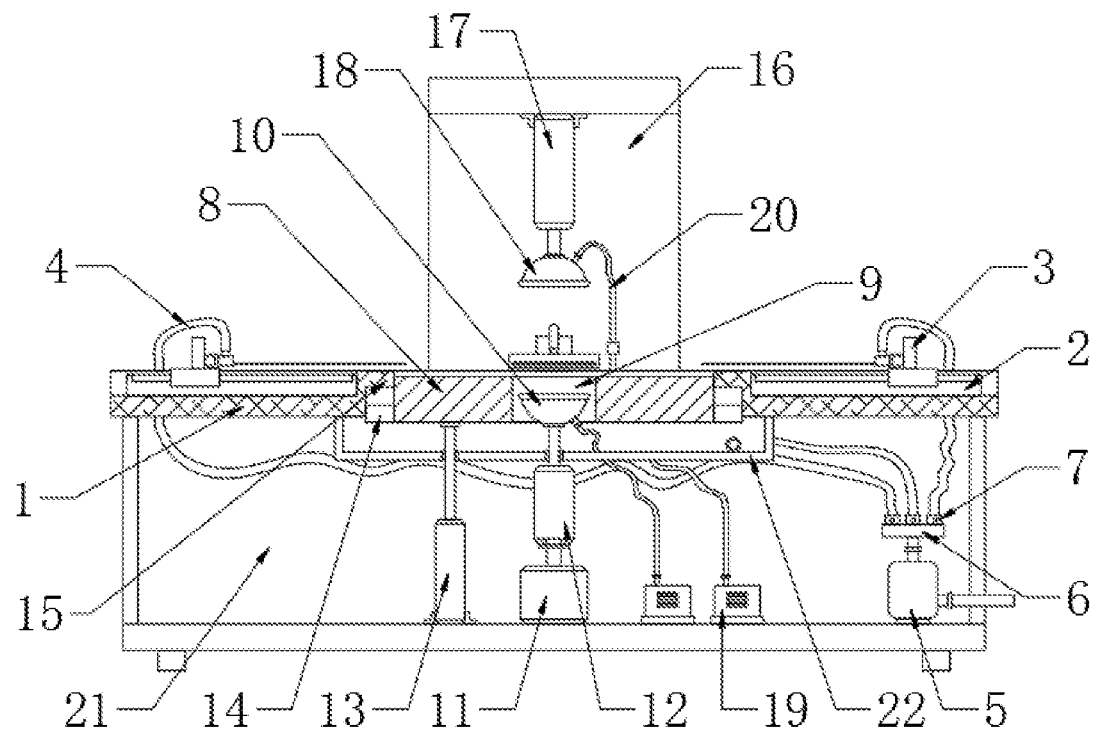
FIG. 4 is a schematic structural diagram of a front view of a dismantling device for a waste photovoltaic module by liquid ejection according to Embodiment II of the disclosure.
Figure 5:
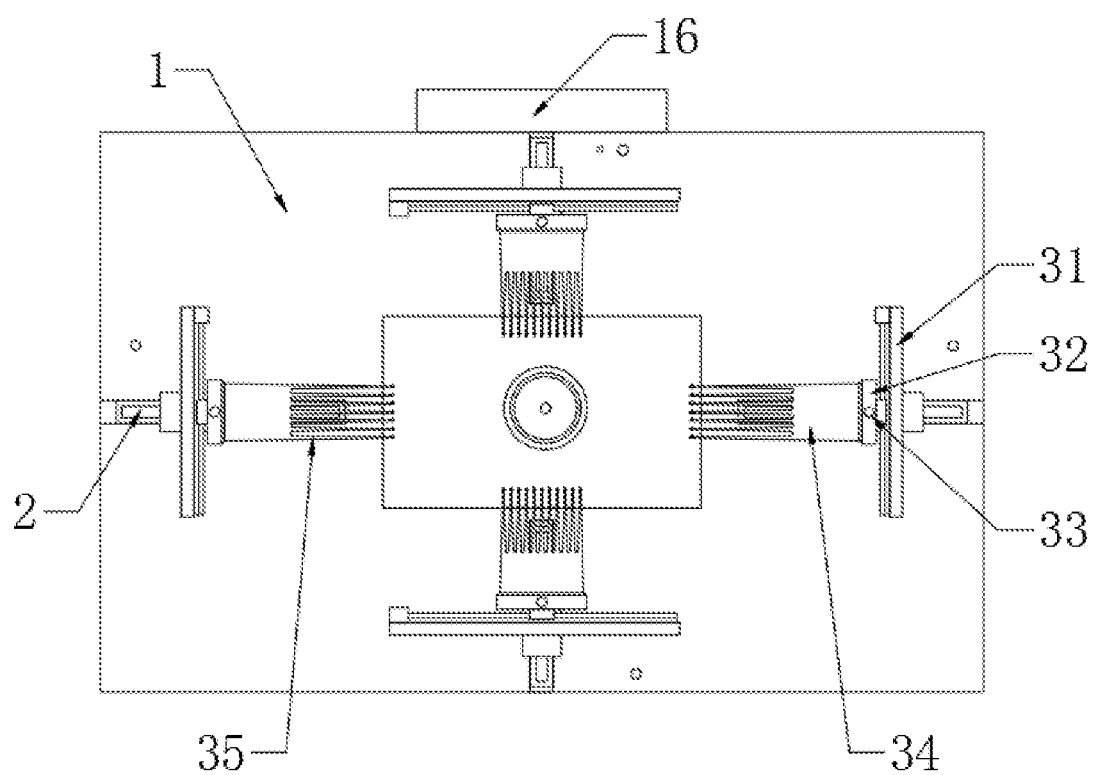
FIG. 5 is a schematic structural diagram of a top view of the dismantling device for a waste photovoltaic module by liquid ejection according to Embodiment II of the disclosure.

Embodiment II: Referring to FIGS. 4-5, this embodiment is different from Embodiment I in that the left and right sides of the tray hole are respectively provided with an ejection mechanism X-direction sliding table 2, and the front and rear sides are respectively provided with an ejection mechanism Y-direction sliding table. Sliders of the ejection mechanism X-direction sliding tables 2 and the ejection mechanism Y-direction sliding tables are respectively fixedly provided with an ejection mechanism 3, and ejection branch tubes 35 of the ejection mechanism 3 face the lifting tray 8.

At the beginning of the ejection of the liquid to the EVA layer, the ejection may be carried out from four sides at the same time, which increases the dismantling speed. After the four ejection branch tubes 35 move to a certain depth, the two ejection branch tubes 35 on the front and rear sides (or the left and right sides) move to the original positions thereof, which prevents the ejection branch tubes 35 from colliding with each other.

The foregoing descriptions are merely preferred implementations of the disclosure, but the protection scope of the disclosure is not limited thereto. Any equivalent substitution or change made based on the technical solution and inventive concept of the disclosure by those skilled in the art within the technical scope disclosed in the disclosure shall fall within the protection scope of the disclosure.

What is claimed is:

1. A dismantling device for a waste photovoltaic module by liquid ejection, comprising a table top, a lifting tray, a bottom suction cup, a top suction cup and a chassis, wherein the chassis is fixedly arranged on a lower side of the table top, wherein
   a middle part of the table top is provided with a tray hole, the lifting tray corresponds to the tray hole up and down, a tray lifting motor is mounted in the chassis, and an upper end of an output shaft of the tray lifting motor is fixedly connected to the lifting tray;
   left and right sides of the tray hole are respectively provided with an ejection mechanism X-direction sliding table, and a slider of the ejection mechanism X-direction sliding table is fixedly provided with an ejection mechanism;
   the ejection mechanism comprises a Y-direction sliding table, a slider of the Y-direction sliding table is located on a side adjacent to the lifting tray, the slider of the Y-direction sliding table is fixedly provided with a liquid collection cavity, an inner side of the liquid collection cavity is provided with a flat ejection portion, and an inner side of the ejection portion communicates with a plurality of ejection branch tubes; and
   the liquid collection cavity communicates with an ejected liquid coupling, an ejected liquid pump is arranged in the chassis, an inlet end of the ejected liquid pump is connected to an ejected liquid supply tube, an outlet end of the ejected liquid pump is connected with a distributing tube, the distributing tube is provided with a same number of liquid valves as the ejection mechanisms, each of the liquid valves is connected to a first end of an ejected liquid tube, and a second end of the ejected liquid tube is connected to the ejected liquid coupling.

2. The dismantling device according to claim 1, wherein a table top limiting portion is arranged in the tray hole, and two sides of the lifting tray are respectively provided with tray limiting strips corresponding to the table top limiting portion up and down.

3. The dismantling device according to claim 1, wherein an ejection branch tube has a same external thickness as the ejection portion and a width gradually narrowing from an outer end to an inner end.

4. The dismantling device according to claim 1, wherein an ejection branch tube has an external thickness of 0.25 mm-0.3 mm.

5. The dismantling device according to claim 1, wherein a middle part of the lifting tray is provided with a suction cup hole, the bottom suction cup corresponds to the suction cup hole up and down, a turning motor is mounted in the chassis, an upper side of the table top is provided with a top frame, a lower side of the top frame is fixedly provided with a top suction cup driving cylinder, and a lower end of a piston rod of the top suction cup driving cylinder is connected to the top suction cup.

6. The dismantling device according to claim 5, wherein two air suction pumps are arranged in the chassis, a coupling of each of the two air suction pumps is connected with an air suction tube, the bottom suction cup and the top suction cup are respectively provided with an air tube coupling, and each air tube coupling is connected to one air suction tube.

7. The dismantling device according to claim 5, wherein an upper end of an output shaft of the turning motor is fixedly provided with a bottom suction cup driving cylinder, and an upper end of a piston rod of the bottom suction cup driving cylinder is fixedly connected to the bottom suction cup.

8. The dismantling device according to claim 1, wherein front and rear sides of the tray hole are respectively provided with an ejection mechanism Y-direction sliding table, sliders of the ejection mechanism Y-direction sliding tables are respectively fixedly provided with the ejection mechanism, and the plurality of ejection branch tubes of the ejection mechanism face the lifting tray.

* * * * *